July 26, 1960 R. E. POWERS 2,946,060
CLIP POSITIONING HEAD FOR FASTENER DRIVING TOOL
Filed April 7, 1958 2 Sheets-Sheet 2
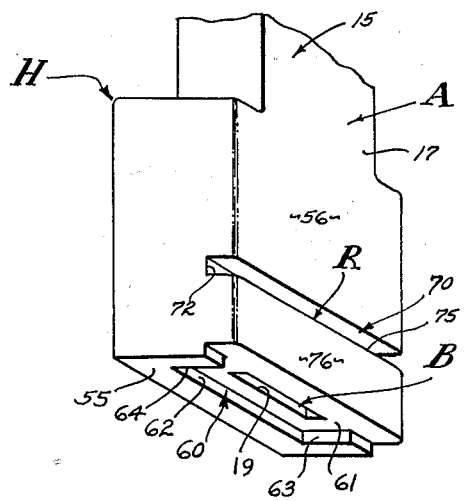
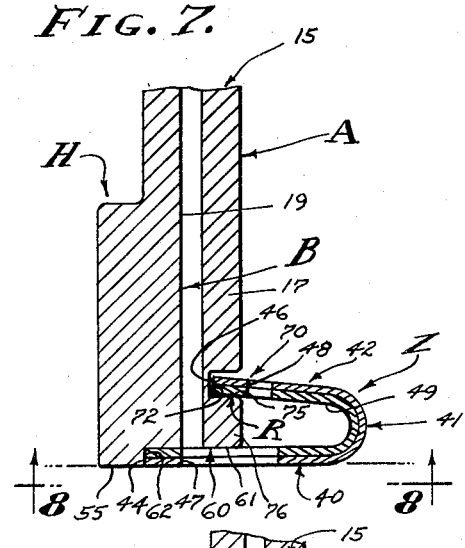
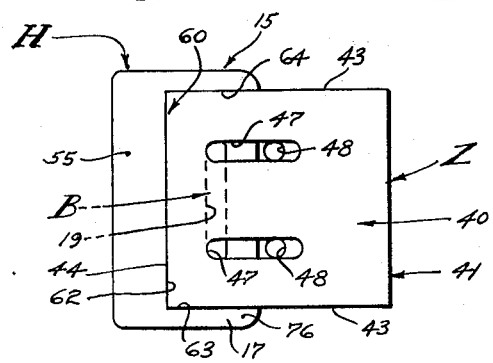
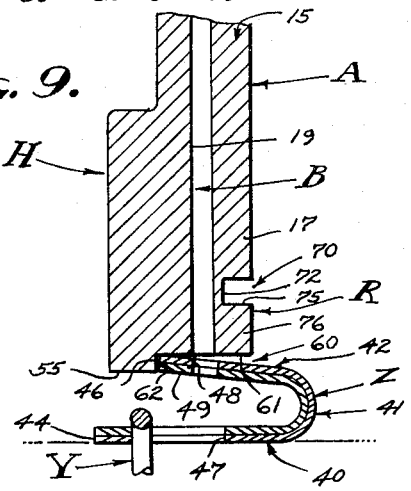
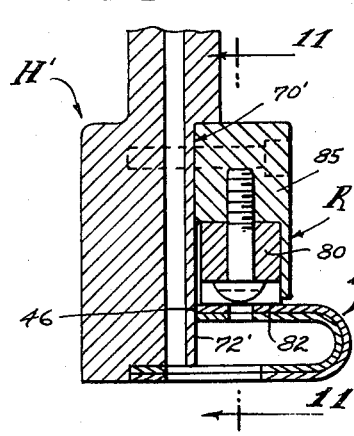
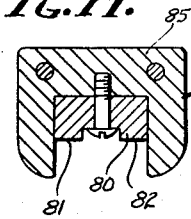
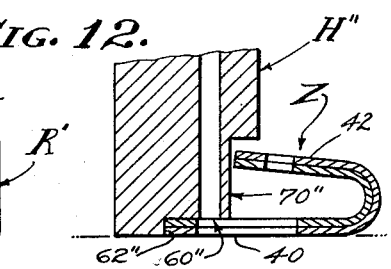
INVENTOR.
RICHARD E. POWERS
BY
Wm H. Maxwell
AGENT United States Patent Office 2,946,060
Patented July 26, 1960

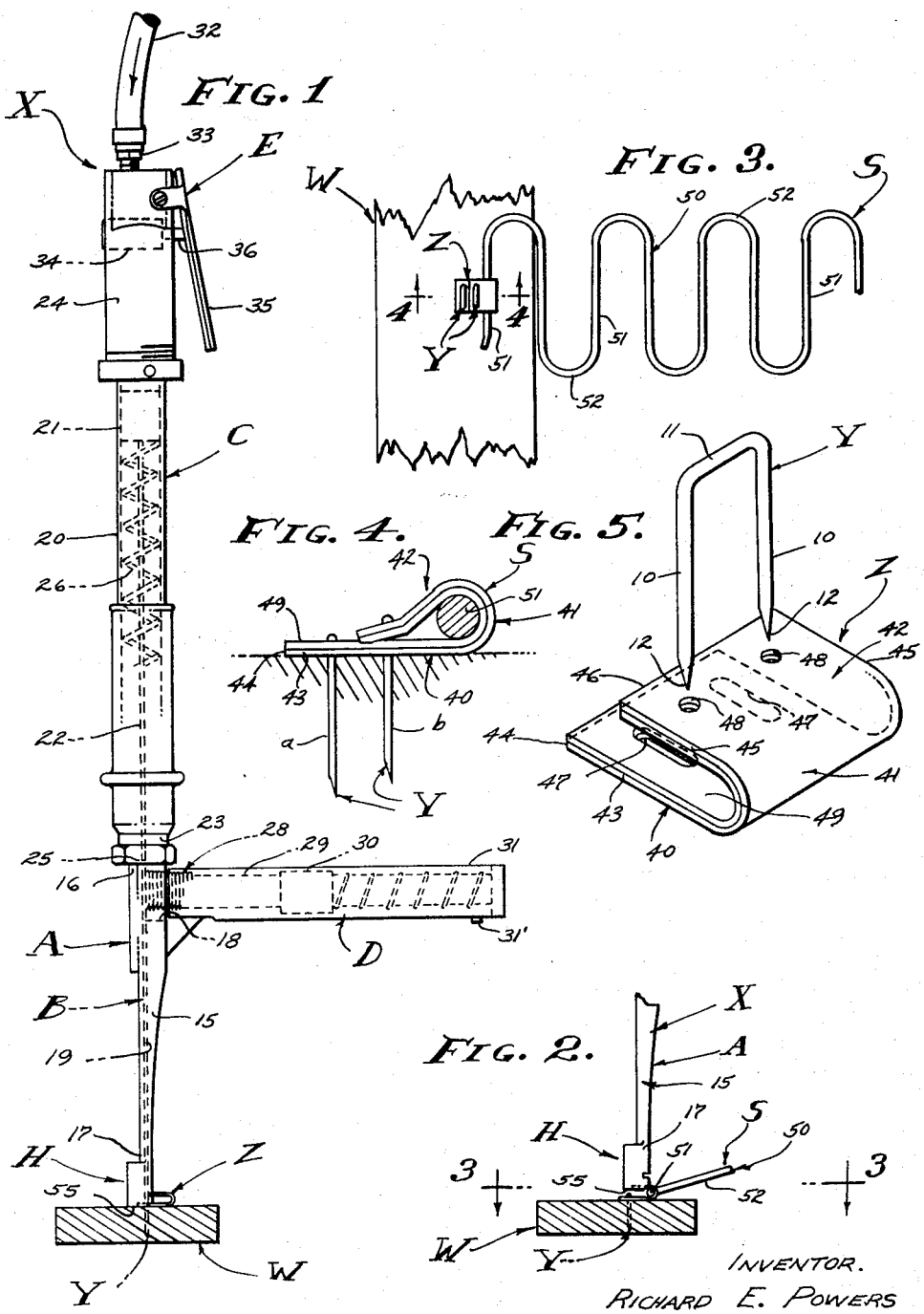

2,946,060
CLIP POSITIONING HEAD FOR FASTENER DRIVING TOOL

Richard E. Powers, Monterey Park, Calif., assignor to Powers Wire Products Company, Inc., Monterey Park, Calif., a corporation of California Filed Apr. 7, 1958, Ser. No. 726,795

5 Claims. (Cl. 1—49)

This invention relates to fastener driving tools and is particularly concerned with a clip positioning head for use in connection with said tools for the installation of, or securing of, an element in working position, for instance a spring mounting clip as used in the manufacture of furniture.

The manufacture of furniture, and the like, involves the installation of clips that are used to anchor the ends of springs, and wire staple type fasteners are employed to secure the clips to the frames of the furniture and further to secure said springs in working position relative to said clips. In the particular relationship of elements involved, the clip must be properly positioned and a first fastener must be properly aligned with the clip for anchoring thereof. Also, a second fastener must be properly aligned with the clip and with the spring to be anchored, said application of the second fastener acting to close the clip around the part of the spring engaged thereby. Said clips and suitable staple type fasteners are commercially available for the purpose referred to and the present invention provides a fastener driving tool that associates or relates said clip and fastener for proper uniform installation thereof, and for reliable anchorage of the springs that are involved.

An object of this invention is to provide a head in a fastener driving tool that properly positions a clip for the reception of a fastener, preferably a U-shaped staple type fastener.

Another object of this invention is to provide a head in a fastener driving tool that properly positions a clip for the reception of a plurality of fasteners, preferably U-shaped staple type fasteners.

It is an object of this invention to provide a head in a fastener driving tool that positions a clip for installation thereof by a fastener, and which also positions said clip for the reception of a second fastener whereby the clip is operative as an anchor for a spring, or the like.

It is another object of this invention to provide a head in a fastener driving tool that positions a clip for the reception of and installation by a fastener and which positions the tool relative to the clip for application of a second fastener whereby the clip is closed onto a part to be secured in operative position, for example closed onto the end of a spring or the like.

It is still another object of this invention to provide a simple and inexpensive head construction that is readily employed and which greatly facilitates the installation of spring mounting clips by the application of staple type fasteners driven by a powered tool, for example a pneumatic operated tool.

The various objects and features of my invention will be fully understood from the following detailed description of the typical preferred forms and applications of my invention, throughout which description reference is made to the accompanying drawings, in which:

Fig. 1 is a side elevation of a fastener driving tool embodying the head construction of the present invention and showing it positioning a clip for installation on a piece of work by a first fastener. Fig. 2 is a fragmentary view of a portion of the structure shown in Fig. 1 and showing how the head construction positions itself relative to the clip for the application of a second fastener. Fig. 3 is a plan view of a spring and clip installation and taken as indicated by line 3—3 on Fig. 2. Fig. 4 is an enlarged sectional view of the clip installation and taken as indicated by line 4—4 on Fig. 3. Fig. 5 is a perspective view of a clip to be acted upon by the head of the present invention. Fig. 6 is a perspective view of the head that I provide. Fig. 7 is a vertical sectional view of the head, as shown in Fig. 6, and shows a clip related thereto for reception of a first fastener, as shown in Fig. 1. Fig. 8 is a view taken as indicated by line 8—8 on Fig. 7. Fig. 9 is a vertical sectional view of the head as shown in Fig. 6 and shows a clip related thereto for reception of a second fastener, as shown in Fig. 2. Figs. 10 and 11 are enlarged views of a modified form of the invention that employs an additional feature of construction in the form of a magnetic element to hold the clip in position relative to the head for the reception of the first fastener, Fig. 10 being a vertical sectional view of the head, and Fig. 11 being a sectional view taken as indicated by line 11—11 on Fig. 10. Fig. 12 is a view similar to Fig. 7 and shows a form of the invention wherein the clip is related to the tool without being retained thereon.

This invention involves, generally, a fastener, driving tool X adapted to apply fasteners Y to a clip Z on a frame W, or piece of work, and specifically to anchor the end of a spring S. The tool X is a power tool adapted to drive the fasteners Y, the fasteners being of any suitable type, or shape, and preferably in the form of U-shaped staples. The clip Z is a part characterized by the provision of means for the reception of a fastener Y, and more specifically for the reception of a plurality of fasteners Y. The part to be anchored may be a spring S, or the like, provided with a part to be received by the clip Z; the clip Z being characterized by a part overlying and adapted to be closed over the said part of the spring S.

In the particular case under consideration, the fastener Y is a staple type fastener that is adapted to be driven into substantially hard material to secure the clip Z in working position. As shown, the staple type fasteners Y are U-shaped and are formed of wire, or the like, and have a pair of spaced sharpened points 12 (see Fig. 5). The staple type fasteners Y are elongate with straight parallel shanks 10 joined by a straight crown 11. The shanks 10 are spaced as particular circumstances require and the crown 11 is adapted to be driven down into engagement with the clip Z to securely hold the clip in place. When the first staple type fastener Y is driven to fasten the clip Z in working position on the work W the clip is ready to receive a part of the spring S and then the second staple type fastener is driven to close the clip Z and thereby anchor the spring part in operating position.

The fastener driving tool that I employ in carrying out the present invention is adapted to be manually operated so that it can be positioned as circumstances require, and when in an upright position as shown in Fig. 1 of the drawings and as described through the specification, the tool X may be used to apply and secure clips Z to a horizontal surface or piece of work W. As shown, the tool X involves a frame A, a fastener driveway B, a fastener drive C, a fastener supply D, and a control E.

The frame A is an elongate part that incorporates the driveway B therein and is provided to support and tie together the other parts of the structure including the fastener drive C, fastener supply D and the control E, The frame A involves a tubular body 15 opening at the top 16 and bottom 17 thereof and with a lateral opening 18 entering into the body intermediate the top and bottom thereof. In accordance with the invention, the frame A is characterized by a clip engaging head H at the bottom 17 thereof.

The fastener driveway B is provided to guide the staple type fasteners Y into the work W and involves a passage 19 that extends longitudinally through the body 15 to open at the top 16 and the bottom 17 thereof. The driveway passage 19 is rectangular in cross section having parallel side walls with suitable clearance for directing the staple type fasteners Y. The lateral opening 18 opens into the driveway passage 19 from the exterior of the body 15, and is provided to feed the fasteners Y into passage 19 from the fastener supply D.

The fastener drive C is preferably a pneumatic powered means and, as shown in the drawings, involves a cylinder 20, a piston 21 and a driver blade 22. The cylinder 20 is carried by and extends from the upper end 16 of the body 15 through a suitable fitting 23. A head 24 is provided to close the upper end of the cylinder 20. The piston 21 is slidably carried within the cylinder 20 and is adapted to operate between the upper and lower ends thereof. The driver blade 22 connected to the piston 21 is an elongate part rectangular in cross section, conforming in cross section to the driveway passage 19. The driver blade 22 depends from the piston 21 and enters the driveway passage 19 and has a lower end 25 that is adapted to cooperate with the crown 11 of each staple type fastener Y. When the driver blade 22 is operated to drive a staple type fastener, the end 25 moves to the lower end 17 of the body 15. A spring 26 acts between the fitting 23 and the piston 21 to lift the piston 21 and driver blade 22 to the up position, as shown in Fig. 1, after being operated to drive a staple type fastener Y.

The fastener or staple supply D is in the form of a magazine adapted to receive a substantially large number of staple type fasteners Y and in accordance with common practice, and as illustrated in Fig. 1 of the drawings, the fasteners Y handled by the tool X are supplied in sacks or sticks 28. The stick 28 of staple type fasteners Y is made up of a plurality of said fasteners which are arranged side by side one against the other in an elongated series and secured together by means of suitable cement, or the like. The supply D is carried at the upper end portion of the body 15 and involves a guide 29 secured to the body 15 at the opening 18 to project laterally therefrom, a spring biased follower 30 and a cover 31. The guide 29 is an elongate part rectangular in cross section and proportioned to fit between the shanks 10 of the staple type fasteners Y and to support the crowns 11 thereof. The guide 29 enters the opening 18 in the upper end portion of the body 15 which opens into the driveway passage 19. The follower 30 is slidably carried on the guide 29 and acts to yieldingly urge the fasteners into the driveway passage 19 which is of sufficient depth to receive one fastener at a time so that the driver blade 22 picks up but one fastener as it moves downwardly through the driveway passage 19. The cover 31 is in the form of a sheath which is engageable over the guide 29, fasteners Y and spring biased follower 30, to house the said parts. The cover 31 may be secured to the outer terminal end of the guide 29, and is preferably a cylindrical tubular part adapted to be used as a handle for manipulation of the gun by the hands of the user. Fastening means, such as a pin 31' engaged with a J-slot is provided to secure the cover 31 in working position.

The control E for the fastener drive is a fluid control adapted to release a charge of air to the cylinder and piston drive C. In practice, the tool X of the present invention is pneumatically powered in which case the cylinder 20 is operable by means of compressed air supplied to the tool by a hose 32 through a suitable fitting 33 or connection on the head 24. A release valve 34, is carried within the head 24 and is controlled by means of a manually operable trigger 35 engaged with the stem 36 of the valve 34. The valve 34 acts to admit air from the hose 32 to the cylinder 20 when the trigger 35 is manually engaged and acts to exhaust air from the cylinder 20 when it is disengaged. With the tool X thus far described it will be readily seen that V-shaped staple type fasteners Y are handled and delivered one at a time to be driven from the lower end 17 of the body through the head H of the tool.

The clip Z is an element that requires positioning relative to the work W and placement relative to the fastener driving tool X. Further, the particular clip Z under consideration requires additional locating relative to the tool X for closing of the clip onto a part of the spring S, as hereinafter described. The clip Z, as illustrated, involves a base 40, a flange 41 projecting from the base, and a lip 42 carried by the flange and overlying the base. The clip Z is basically a sheet metal part, rectangular in plan configuration and, in practice, is substantially square. The base 40 is a flat plate-like element having straight parallel sides 43 and a straight end 44 normal to the sides. The flange 41 is an upstanding part that projects perpendicularly from the base 40 and is preferably curved or arcuate in form to form a continuation of the base 40 that is tangent thereto. As shown, the flange 41 continues from the margin of the base 40 opposite the end 44. The lip 42 is a flat plate-like element having straight parallel sides 45 and a straight end 46 normal to the sides. The arcuate flange 41 is tangentially joined to the lip 42, and the end 46 thereof is stepped back a substantial distance from the end 44. That is, the base 40 is longer than the lip 42 so that the ends thereof are offset, as shown.

Although it is possible that a fastener will be driven through the base 40 and/or lip 42, it is preferred that an opening or openings 47 and 48 be provided in the base and lip, respectively. In the particular case illustrated, when U-shaped fasteners Y are employed, a pair of spaced openings 47 is formed in the base 40 and a pair of spaced openings 48 is formed in the lip 42. The openings 47 and 48 are equidistant from the ends 44 and 46, respectively, and they are equally spaced from the sides 43 and 45. As shown, the openings 48 are small round openings while the openings 47 are elongated in a direction to underlie the openings 48.

In the particular case under consideration the clip Z is provided with a bearing element 49 that is a sheet of suitably lubricated material coextensive in configuration with the elements 40, 41 and 42 of the clip. As shown, the element 49 overlies the base 40, extends up the flange 41, and underlies the lip 42. Further, openings may be provided in the element 49 registering with and shaped to conform with the shape of the openings 47 and 48, above described.

The element to be anchored in position is, in the case under consideration, a spring S, preferably a sinuated spring. The spring S is made of a length of spring wire 50 bent into a multiplicity of waves or undulations of like formation and in a common plane. Each wave has a transversely extending portion 51 and is connected to the next adjoining wave by a bent or turned side portion 52. The side portions 52 occur alternately at opposite sides of the spring S. The terminal portion 51 of the spring S is to be anchored and this is the part that is adapted to be secured by the clip Z when fastened in working position by the fasteners Y.

In accordance with the present invention, I provide the head H that I form on the lower end 17 of the body 15 of the tool X. As shown in Fig. 4 of the drawings, the head H is adapted to be related to the clip Z for initially positioning the clip and applying an anchoring fastener $a$, and for applying a closing fastener $b$. As best illustrated in Fig. 6, the head H is preferably an enlargement of the bottom 17 of the body 15 formed to firstly (Fig. 7) position the tool X relative to the clip Z for the application of the fastener *a* to anchor the clip in position, and secondly (Fig. 9) to position the tool X relative to the clip Z for the application of the fastener *b* to close the clip onto the terminal portion 51 of the spring S. The head has a flat end face 55 in a plane normal to the axis of the tool X from which the guideway passage 19 opens and from which the driver blade 22 projects the fasteners Y. A recess 60 is provided in the face 55 to firstly position the tool X for application of said anchoring fastener *a* and secondly for positioning the tool X for application of the closing fastener *b*. Further, a recess 70 is provided in the head, at the bottom 17 of the body 15, to accommodate and also to position portions of the clip Z when it is positioned to receive the fastener *a*.

The recess 60 is formed in the face 55 to open downwardly and laterally and is adapted to receive and position either the base 40 or the lip 42 of the clip Z. The recess 60 has a flat bottom face 61 in a plane spaced upwardly from the plane of the face 55, and the guideway passage 19 opens into the recess 60 at the bottom face 61. The recess 60 has a clip positioning stop 62 spaced laterally from the passage 19 a distance equal to the spacing of the openings 47 and 48 from the ends 44 and 46, respectively. The stop 62 is a flat wall that extends parallel with the width of the passage 19 and projects normally between the bottom face 61 and face 55. The guides 63 and 64 are normal to the stop 62 in order to direct the clip Z into the recess 60 with the sides 43 or 45 in engagement with the guides 63 and 64 and with the ends 44 or 46 positioned against the stop 62.

The recess 70 is formed in the side of the head H, the head having a side 56 that extends parallel with the guideway passage 19 and normal to the plane of the face 55. The recess 70 opens laterally of the head and from the side 56, that is, the side from which the recess 60 opens laterally. As shown in Fig. 7, the recess 70 accommodates the end portion of the lip 42 when the base 40 is positioned against the stop 62 in the recess 60. The recess 70 is formed in the head at a point spaced upward from the face 55 a distance equal to the spacing of the lip 42 from the base 40. The lip 42 may be accommodated in the recess 70 with clearance or, as shown, the recess 70 has a stop 72 adapted to engage and position the end 46 of the lip when the end 44 of the base is engaged with the stop 62. In carrying out the invention, either the stop 62 or 72 may be employed to position the clip Z, or as shown in Fig. 7 both stops may be employed for said positioning function. With the ends 44 and 46 engaged with the stops 62 and 72, respectively, the clip Z is aligned so that the base 40 is in a plane adjacent to and parallel with the face 55, and in flat engagement with the bottom face 61.

In Fig. 12 of the drawings I have illustrated a basic form of head H″ wherein the recess 70″ is employed simply to accommodate the lip 42, in the manner above described. In this case the base 40 engages the stop 62″ to position the clip Z while the lip 42 enters the recess 70″ with clearance. However, it is to be understood that the clip Z may be proportioned making it desirable to position the lip 42 by engaging it with the stop 72″ while the base 40 enters the recess 60″ without engaging the stop 62″. In the relationship of elements shown in Fig. 12 the clip Z remains free of the tool X and is not retained thereon, or attached thereto, this condition being desirable in some instances.

In accordance with the present invention, means R is provided to retain the clip Z in position on the head H, if so desired, for the application of the fastener *a*. In practice, the clip Z, as originally formed, is made with the lip 42 in a plane substantially parallel with the plane of the base 40. As best illustrated in Fig. 7 of the drawings, the means R involves a shoulder 75 spaced from the bottom face 61 a distance somewhat greater than the normal distance between the base 40 and lip 42. The shoulder is flat and in a plane parallel with the plane of the face 61, and as indicated, the clip is manipulated into position (see Fig. 7) whereupon the base 40 and lip 42 are slightly spread apart, whereby the clip yieldingly grips a lug-shaped portion 76 of the head H, between the shoulder 75 and face 61, or is held in place by means of frictional engagement.

In Figs. 10 and 11 of the drawings, I have shown a modified form of the invention wherein means R′ is provided to retain the clip Z in position on the head H′ for the application of the fastener *a*. In this form of the invention, the formation of the clip per se is not relied upon for retention on the head H′, and in place thereof I provide the magnetic means R′ to hold the clip Z in position for application of the fastener *a*. As shown, the recess 70′ is essentially the same as the recess 70 above described and it has a stop 72′ to engage and position the end 46 of the clip A, if desired. The means R′ involves a permanent magnet 80 carried by a housing 85, the magnet 80 having a pair of spaced pole faces 81 and 82 in a common plane to engage the top of the lip 42 when the clip Z is positioned as in Fig. 10. The housing 85 encloses the magnet 80 and is made of non-magnetic material in order to shield the magnet. As shown, the housing 85 is secured to the side of the head H′ and is preferably seated on the stop 72′ of the recess 70′. The housing 85 encloses the sides and ends of the magnet 80 leaving the pole faces exposed, and spaces the magnet from the stop 71′.

From the foregoing it will be apparent that a clip Z is readily retained in place at the head of the fastener driving tool X for the reception of an anchoring fastener *a* to be driven through openings 47 in the base 40 of the clip. Further, the tool X is adapted to be readily repositioned relative to the clip for the reception of a second closing fastener *b* to be driven through the openings 48 in the lip 42. In the process of applying the second fastener *b* the driver blade 22 of the tool X projects the fastener through the openings 48. In the process of operating the tool X, the moving parts thereof are snubbed or damped at the end of the work stroke and this action results in a sudden downward force that causes the lower end of the tool X to drive the lip 42 downwardly into pressured engagement with the base 40 thereby closing the clip Z. In other words, the clip Z is closed by clinching of the lip 42 into engagement with the base 40, or in substantial engagement therewith, it being understood that the part 51 of the spring S, or any other like part, is entered into the clip between the base and lip and at the flange 41, all as circumstances require.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A fastener driving tool with a head for positioning a ferrous clip having a flat base and a flat lip joined by a connecting flange to and overlying the base and for the application of a fastener to the base to anchor the clip and for the application of a fastener to the lip to close the clip to engage the lip and base, and including, an elongate body with a fastener driveway passage extending therethrough and opening at a bottom face normal to the body, and a head at the bottom of the body with a recess formed therein to position the base and lip of the clip for reception of a fastener, a second recess in the head to accommodate the lip of the clip, and a magnet carried by the head and with a face exposed at said second recess and engaging the lip and retaining the clip in position on the head during the driving of the fastener.

2. A fastener driving tool with a head for positioning a clip having a flat base and a flat lip joined to and overlying the base and for the application of a fastener to the base to anchor the clip, and including, an elongate body with a fastener driveway passage extending therethrough and opening at a bottom face normal to the body, and a head at the bottom of the body and with a recess therein to position the base of the clip for reception of a fastener and with a second recess in the head to accommodate the lip of the clip and engaging the lip for alignment of the clip with the bottom face and said passage, said recesses opening at the side of the head and there being an upwardly faced shoulder in said second recess and spaced upwardly from the first-mentioned recess a distance greater than the spacing of the lip of the clip overlying the base so as to engage beneath the lip to spread the lip and base for retaining the clip in position on the head during driving of said fastener.

3. A fastener driving tool with a head for positioning a clip having a flat base and a flat lip joined to and overlying the base and for the application of a fastener to the base to anchor the clip, and including, an elongate body with a fastener driveway passage extending therethrough and opening at a bottom face normal to the body, and a head at the bottom of the body and with a recess formed therein to receive and accommodate the base of the clip and with guide walls to direct the clip into the recess and with a stop wall to engage the base and position the clip for reception of a fastener and with a second recess formed in the head to receive and accommodate the lip of the clip and with a stop wall to position the clip for alignment with the bottom face and said passage, said recesses opening at the side of the head and there being an upwardly faced shoulder in said second recess to engage beneath the lip to spread the lip and base for retaining the clip in position on the head during driving of said fastener.

4. A fastener driving tool with a head for positioning a clip having a flat base and a flat lip joined by a connecting flange to and overlying the base and for the application of a fastener to the base to anchor the clip and for the application of a fastener to the lip to close the clip to engage the lip and base, and including, an elongate body with a fastener driveway passage extending therethrough and opening at a bottom face normal to the body, and a head at the bottom of the body and with a recess therein to position the base of the clip for reception of a first fastener and also to position the lip of the clip for the reception of a second fastener and with a second recess in said head to accommodate the lip of the clip and engaging the lip for alignment of the clip with the bottom face and said passage during the driving of said first fastener.

5. A fastener driving tool with a head for positioning a clip having a flat base and a flat lip joined by a connecting flange to and overlying the base and for the application of a fastener to the base to anchor the clip and for application of a fastener to the lip to close the clip to engage the lip and base, including, an elongate body with a fastener driveway passage extending therethrough and opening at a bottom face normal to the body, and a head at the bottom of the body and with a recess formed therein to receive the base of the clip and with guide walls to direct the clip into the recess and with a stop wall to position the base of the clip for reception of a first fastener and also to position the lip of the clip for the reception of a second fastener and with a second recess formed in said head to receive the lip of the clip and with a stop wall to engage the lip and position the clip for alignment with the bottom face and said passage during the driving of said first fastener.

References Cited in the file of this patent

UNITED STATES PATENTS

| | | |
|---|---|---|
| Re. 23,786 | Baisch | Feb. 23, 1954 |
| 2,558,230 | Barron | June 26, 1951 |
| 2,588,738 | Lundgren | Mar. 11, 1952 |
| 2,673,980 | Ballachey | Apr. 6, 1954 |
| 2,675,546 | Catlin | Apr. 20, 1954 |
| 2,697,221 | Brayton | Dec. 21, 1954 |
| 2,705,323 | Bossong | Apr. 5, 1955 |
| 2,806,218 | Henning | Sept. 17, 1957 |

FOREIGN PATENTS

| | | |
|---|---|---|
| 682,904 | Germany | Oct. 26, 1939 |